United States Patent [19]

Nelson et al.

[11] 3,879,213

[45] Apr. 22, 1975

[54] SPOT REMOVING SUBSTANCE

[76] Inventors: William L. Nelson, 7933 E. 36th St., Indianapolis, Ind. 46226; Chauncey M. Fine, R.R. No. 8, Crawfordsville, Ind. 47933

[22] Filed: Apr. 8, 1974

[21] Appl. No.: 458,565

Related U.S. Application Data

[63] Continuation-in-part of Ser. No. 255,618, May 22, 1972, abandoned.

[52] U.S. Cl. .............................................. 106/286
[51] Int. Cl. ............................................. C09k 3/00
[58] Field of Search ................... 106/286, 287, 284; 252/450

[56] References Cited
UNITED STATES PATENTS
1,932,832  10/1933  Turrentine .......................... 252/450

*Primary Examiner*—Theodore Morris
*Attorney, Agent, or Firm*—Trask, Jenkins & Hanley

[57] ABSTRACT

A spot removing substance which may be used on carpets, rugs, upholstery and the like is made by thoroughly mixing a colloidal clay adsorbent, a fine clay adsorbent having deodorizing properties, and a heavy sand carrier, in volumetric proportions of about 80%, 10%, and 10%, respectively.

3 Claims, No Drawings

SPPOT REMOVING SUBSTANCE

This application is a continuation-in-part of copending application Ser. No. 255,618, filed May 22, 1972, now abandoned.

BACKGROUND OF THE INVENTION

This invention relates to a substance for removing spots and stains and odors from carpets, rugs, upholstery and the like. Numerous spot removers are commercially available. Many deteriorate with time, are toxic, are difficult to use, and are woefully lacking in effectiveness.

The spot remover of this invention in in particulate form and is non-toxic and non-deteriorating, unlike so many of the commercially available spot removers. Moreover, there is no necessity for rubbing or scrubbing in order to remove the spot or stain. The substance is merely applied to the spot and subsequently removed as by a vacuum cleaner.

DESCRIPTION OF THE PREFERRED EMBODIMENT

The spot removing substance of this invention comprises a clay adsorbent, a second, finer clay adsorbent and deodorizer, and a heavy sand. The clay adsorbent comprises about 80% by volume of the substance. The fine clay adsorbent and deodorizer, and the heavy sand each comprises about 10% by volume of the substance. These ingredients are thoroughly mixed together to form the spot removing substance.

The clay adsorbent is preferably fuller's earth, a naturally occurring earthy substance resembling potter's clay but lacking in plasticity. Fuller's earth consists chiefly of a colloidal hydrous aluminum silicate and is a good moisture adsorbent. By way of example, the fuller's earth may comprise approximately the following:

| | |
|---|---|
| Silicon | 68.0% |
| Aluminum | 12.0% |
| Magnesium | 10.5% |
| Iron | 5.0% |
| Calcium | 1.7% |
| Phosphorus | 1.0% |
| Potassium | 1.0% |
| Titanium | 0.7% |
| Trace Elements | 0.1% |

Fuller's earth mined in Georgia has been found to be particularly advantageous as an ingredient in this spot removing substance.

The second fine clay should be finer than the fuller's earth and should have adsorbent properties as well. A fine blue clay mined in California and known as Blue Cloud has been found suitable for this substance, and is believed to serve to some extent as a deodorizer. The Blue Cloud may comprise approximately the following:

| | |
|---|---|
| Aluminum Silicate | 96.6% |
| Calcium | 1.0% |
| Magnesium | 1.0% |
| Sodium | 0.5% |
| Iron | 0.5% |
| Potassium | 0.1% |
| Manganese | 0.005% |
| Copper | 0.001% |

The heavy sand which acts as a carrier may be a washed white sand such as white quartz sand which may comprise approximately the following:

| | |
|---|---|
| Silicia | 99.88% |
| Iron Oxide | 0.02% |
| Aluminum Oxide | 0.10% |
| Titanium Dioxide | 0.015% |
| Calcium Oxide | 0.01% |
| Magnesium Oxide | 0.005% |

Such a sand has been obtained from Michigan. This carrier sand seems to attract the fuller's earth and the Blue Cloud, somewhat like a magnet, and carry them down into the material to be cleaned. Alternatively, a less expensive, commonly available tan sand, such as tan drift sand, which may comprise approximately 99.6% silicia and 0.4% other ingredients, may be used in combination with the white sand to serve as a carrier. When the white sand and tan sand are both used, they should each constitute about 5% by volume of the substance.

After the ingredients are thoroughly mixed together, the substance may be stored without losing its effectiveness. In addition to its non-deteriorating quality, this substance creates no odor or toxic fumes and is non-poisonous.

To use this substance to remove a spot or stain from a carpet, for example, any excessive liquid or moisture should be removed, as by a sponge or paper towel. The substance is then sprinkled on the spot and allowed to thoroughly dry. For this purpose it is well to remain there for a period of time, for example for several hours. The substance and the spot may then be removed from the carpet by a vacuum cleaner. Where a spot has completely dried before it is removed, it may be necessary to wet it before applying the spot removing substance.

The use of this substance is not harmful to persons or to the material on which it is used. Rubbing and scrubbing the spot is eliminated. This substance has been found to be effective in removing such difficult spots and stains and odors caused by urine, vomit, spilled food and beverages, and greasy liquid base materials.

We claim:

1. A substance for removing spots and stains from carpets and rugs and the like, comprising a thoroughly mixed combination of fuller's earth, Blue Cloud clay, and white sand comprising about 99% silica wherein said fuller's earth comprises about 80% by volume, said Blue Cloud comprises about 10% by volume, and said white sand comprises about 10% by volume of the substance.

2. The invention set forth in claim 1 with the addition of second, heavy drift sand.

3. The invention set forth in claim 2 wherein said fuller's earth comprises about 80% by volume, said Blue Cloud comprises about 10% by volume, said white sand comprises about 5% by volume, and said second sand comprises about 5% by volume of the substance.

* * * * *